United States Patent [19]
Hancock et al.

[11] Patent Number: 5,647,686
[45] Date of Patent: Jul. 15, 1997

[54] SHAFT COUPLING

[75] Inventors: Michael Thomas Hancock, Warwickshire; David Thomas Wormall, Leicestershire, both of England

[73] Assignee: Nastech Europe Limited, Coventry, England

[21] Appl. No.: 657,863

[22] Filed: May 31, 1996

[51] Int. Cl.$^6$ ........................................ F16B 1/00
[52] U.S. Cl. ........................... 403/373; 403/359; 403/328
[58] Field of Search .................... 403/359, 322, 403/325, 326, 328, 327, 315–319, 57, 157, 373; 464/134, 182

[56] References Cited

U.S. PATENT DOCUMENTS

| | | | |
|---|---|---|---|
| 2,460,147 | 1/1949 | Rappl | 403/359 |
| 3,179,450 | 4/1965 | Recker | 403/359 X |
| 3,498,641 | 3/1970 | Bohlen | 403/315 X |
| 3,750,227 | 8/1973 | Hayhurst et al. | 403/325 X |
| 4,106,311 | 8/1978 | Euler | 403/359 X |
| 4,189,248 | 2/1980 | Sully | 403/359 X |
| 4,283,158 | 8/1981 | Takahata | 403/322 |
| 4,603,998 | 8/1986 | Bober et al. | 403/359 X |
| 4,628,758 | 12/1986 | Yuzuriha et al. | 403/359 X |
| 4,927,286 | 5/1990 | Hobluigie et al. | 403/322 |
| 5,165,817 | 11/1992 | Hoblingre et al. | 403/290 X |
| 5,253,949 | 10/1993 | Oxley et al. | 403/317 |
| 5,358,350 | 10/1994 | Oertle | 403/290 X |

FOREIGN PATENT DOCUMENTS

| | | | |
|---|---|---|---|
| 535684 | 1/1957 | Canada | 403/359 |
| 3839325A1 | 5/1990 | Germany. | |
| 4134802C1 | 3/1993 | Germany. | |
| 731103 | 4/1980 | U.S.S.R. | 403/378 |
| 2124739 | 2/1984 | United Kingdom. | |
| 2173572 | 10/1986 | United Kingdom. | |

Primary Examiner—Harry C. Kim
Attorney, Agent, or Firm—Michael H. Minns; Robert F. Palermo

[57] ABSTRACT

A shaft coupling includes a shaft with a circumferential groove near one end, a shaft receiving member and a resiliently loaded shaft retention member in the shaft receiving member. The shaft retention member is fitted about a clamping bolt with one end of the spring engaging in the groove of the shaft. The shaft can be a vehicle steering column shaft and the shaft receiving member can be a yoke of a universal joint.

6 Claims, 2 Drawing Sheets

SHAFT COUPLING

BACKGROUND OF THE INVENTION

This invention relates to a shaft coupling. More particularly, the invention relates to a snap retention coupling between a vehicle steering column and a universal joint.

In the past, various methods have been applied to coupling steering column shafts with universal joint yokes and most of these provide a permanent connection.

With detachable connections, it has been the practice to insert the shaft into the yoke and then to fit a bolt to clamp the yoke around the shaft. However, where the coupling is one where the shaft end is splined and is inserted into a splined bore in the yoke, if the shaft has not been inserted in the yoke sufficiently far, then tightening of the bolt will cause the clamping effort to be applied on the splines. There is then the risk that the splines in use can become worn or fretted so that, in perhaps one or two years' time, there is a risk of the shaft being able to rotate and therefore not to transmit steering motion.

The foregoing illustrates limitations known to exist in present shaft couplings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a shaft coupling comprising: a shaft receiving member, the shaft receiving member having a transversely extending aperture therethrough, a shaft receiving bore therein and a longitudinally extending slot substantially coextensive with said shaft receiving bore; a shaft having a groove in its circumference, the shaft being inserted into the shaft receiving bore; and a retention means within said longitudinal slot for engaging a transversely extending pin member and for biasingly engaging the shaft groove.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

According to the present invention, there is provided a shaft coupling comprising a shaft, a shaft receiving member and a resiliently-loaded shaft retention member in said shaft receiving member, the shaft having a groove in its circumference into which said retention member is resiliently urged upon insertion of the shaft in said shaft receiving member, the shaft retention member being so arranged in said shaft receiving member that movement apart of said shaft and shaft receiving member is normally prevented by said shaft retention member being urged into said groove.

Preferably, the end of the shaft in the region of the groove is splined, the splines of the shaft engaging in corresponding splines of a shaft receiving bore of the shaft receiving member. It will be appreciated that other shapes of cross-section can be utilized, e.g. triangular, to permit transmission of rotary force. Preferably, the shaft retention member is a rod-like member extending transversely of the axis of the shaft, the rod like member being guided in an elongate slot in the shaft receiving member, the slot allowing movement of the rod-like member in a direction to enter the groove and in an opposite direction when urged against the resilient bias acting on the rod-like member. Preferably, the rod-like member is a bolt which can be tightened when it is in engagement with the shaft in the shaft receiving member.

Instead of the bolt itself acting as a shaft retention member, a separate shaft retention member can be provided. This can be in the form of a wire spring with one end intended to engage in the groove and the other end being restrained from rotation in at least one direction. This wire spring can be a torsion spring fitted around the bolt.

The invention has particular applicability where the shaft is a vehicle steering column shaft and where the shaft receiving member is a yoke of a universal joint.

Figure 1:
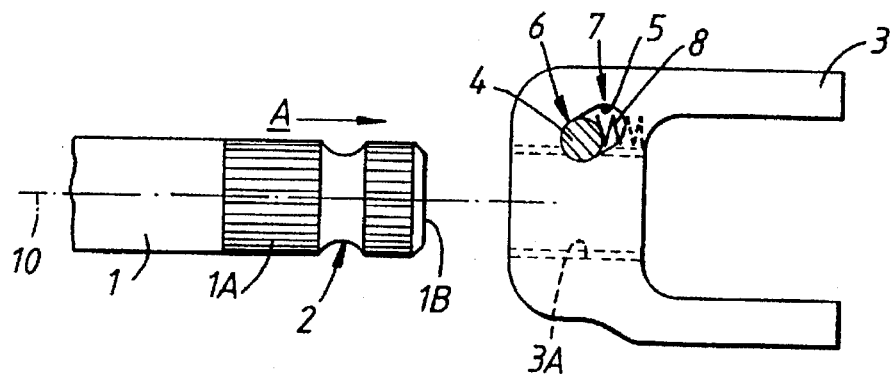
FIG. 1 is a diagrammatic side view of one embodiment of a shaft coupling showing a vehicle steering column shaft prior to retention in a universal joint yoke.

FIG. 1 shows one end of a vehicle steering column shaft 1, which has splines 1A. A circumferential groove 2 is provided in the shaft 1 near the end 1B of the shaft 1 and interrupting the splines 1A. The groove 2 could be in the form of a flat. A shaft receiving member is in the form of a slotted yoke 3 of a universal joint for the steering column, the yoke 3 being provided with a splined through-bore 3A to receive the splined end of the shaft 1. Interaction of the splines on the shaft and in the bore facilitate mutual rotation of shaft and yoke.

Figure 2:
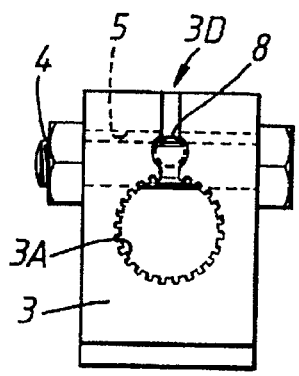
FIG. 2 is an end view showing the rear face of the yoke shown in FIG. 1.
Figure 3:
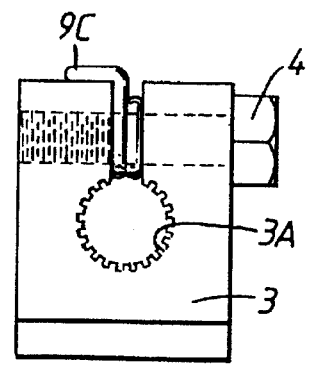
FIG. 3 is a view similar to FIG. 2 and illustrating a yoke of a second embodiment of shaft coupling.

To facilitate retention of the shaft 1 in the bore 3A, a resiliently-loaded shaft retention member is provided. This takes the form in the embodiment illustrated in FIGS. 1 and 2 of a clamp bolt 4 which is located in an elongate slot 5 in the yoke 3. The arrangement of the bolt 4 and slot 5 is such that the bolt extends transversely of the longitudinal axis 10 of the shaft 1. In one end of the elongate slot 5 (bolt position 6), the bolt 4 will sit snugly in the groove 2 in the shaft. In a second, opposite end of the slot 5 (bolt position 7), the bolt 4 is clear of the groove 2. A coil compression spring 8 is located in another bore in the yoke 3, one end of the spring 8 always bearing on a length of the bolt 4 to urge it into the first bolt end position 6.

Prior to assembly of the steering column shaft 1 in the yoke 3, the situation is as shown in FIG. 1, with the bolt 4 being urged by the spring 8 into the bolt end position 6. The shaft 1 is moved in the direction of the arrow A and the splines 1A of the shaft enter the splined bore 3A of the yoke 3. The head end 1B strikes the bolt 4 and moves it against the resilient bias of the spring 8 in the slot 5 towards the position 7. Further movement of the shaft 1 in the direction of the arrow A allows the bolt 4 to snap into the groove 2, thereby returning to its position 6.

It will be noted that the angular relationship between the elongate slot 5 and the direction of entry of the shaft 1 and therefore of the longitudinal axis of the shaft 1 and bore 3A is such as to prevent the shaft 1 from being pulled out of the bore 3A because any tendency for movement in this pulling apart direction (opposite to the arrow A) will force the bolt 4 to bed into the groove 2.

Should it be necessary to remove the shaft 1 from the yoke 3, the bolt 4 must be moved manually outwards in the slot 5 towards the position 7 against the bias of the spring 8.

Once the shaft 1 and yoke 3 have been coupled together, the bolt 4 can be tightened to cause the yoke 3 to clamp on the shaft 1.

It will be appreciated that the present coupling allows swift snap retention while subsequently resisting pulling apart without requiring additional action to release the bolt 4 from the groove 2.

Figure 5:
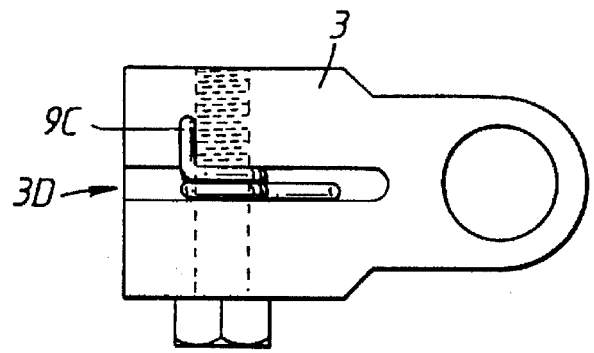
FIG. 5 is a plan view of the yoke shown in FIG. 3.
Figure 6:
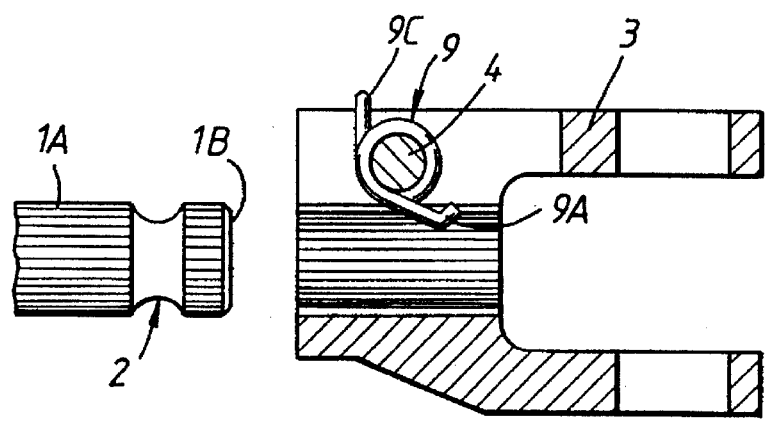
FIG. 6 is a side view (partially in cross-section) of the yoke of FIGS. 3 and 5 and showing the vehicle steering column shaft prior to retention by a torsion spring in the yoke.
Figure 7:
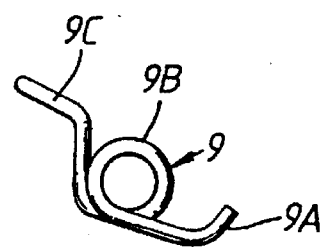
FIG. 7 is a diagrammatic view of the torsion spring itself.

Referring now to FIGS. 3 to 7, an alternative embodiment is illustrated in which the resiliently loaded bolt 4 is replaced by a torsion spring 9 to act as the shaft retention member. The torsion spring 9, as best seen in FIG. 7, includes a barbed end 9A for engaging the groove or flat 2, a central coiled portion 9B for location about the bolt 4 and a bent other end portion 9C for engagement under its own resilient pressure against an outer surface, of the yoke 3 (FIGS. 3 and 6) in order to prevent the torsion spring 9 from rotating.

Figure 6A:
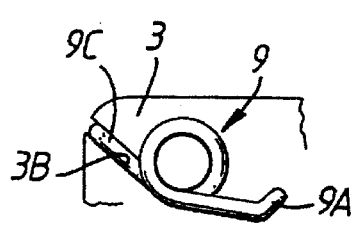
FIG. 6A shows an alternative construction to hold the torsion spring in place.

In an alternative arrangement illustrated in FIG. 6A, the end 9C of the torsion spring 9 is held in a retention groove 3B in the yoke 3.

In use, as the shaft 1 enters the bore 3A of the yoke 3, the barbed end 9A of the torsion spring 9 is flexed upwards as viewed in FIG. 6 until the shaft 1 is pushed sufficiently far in for the end 9A to snap into the groove 2.

The barbed end 9A of the torsion spring 9 locks into the groove 2 upon any tendency for the shaft 1 and yoke 3 to be pulled apart.

Figure 4:
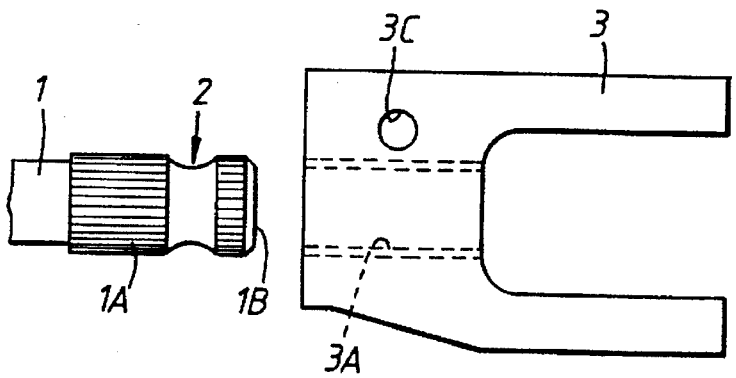
FIG. 4 is a diagrammatic side view of the yoke and shaft shown in FIG. 3, the yoke including an aperture to receive a clamping bolt.

As can be seen in FIG. 4, the yoke 3 is provided with an aperture 3C to receive the bolt 4 and FIG. 5 shows that the torsion spring 9 is housed in the slotted part 3D of the yoke 3.

In the embodiments illustrated, it will be appreciated that the constructions provide a shaft 1 to yoke 3 connection that will fit together easily but will not pull apart and so will ensure that correct spline/shaft penetration is made before the bolt 4 is tightened. When correct penetration has been reached, the operator cannot pull the shaft 1 out and so the operator then knows there is correct positioning for the yoke 3 to be clamped about the shaft 1 by tightening the bolt 4.

Instead of the form of springs illustrated, it will be appreciated that the springs could be in other forms such as a leaf spring or a rubber or plastics spring.

Having described the invention, what is claimed is:

1. A shaft coupling comprising:

a shaft receiving member, the shaft receiving member having a transversely extending aperture therethrough, a shaft receiving bore therein, and a longitudinally extending slot substantially coextensive with said shaft receiving bore;

a shaft having a groove in its circumference, the shaft being inserted into the shaft receiving bore; and a retention means within said longitudinally extending slot for engaging a transversely extending pin member and for biasingly engaging the shaft groove wherein the retention means comprises a torsion spring having a central coiled portion engaging the pin member and an end portion engaging the groove in the circumference of said shaft.

2. The shaft coupling according to claim 1, wherein the end of the shaft proximate the groove is splined, the shaft receiving bore having corresponding splines about its inner circumference.

3. The shaft coupling according to claim 1, wherein the pin member is a clamping bolt means for clamping the shaft receiving member to the shaft.

4. A shaft coupling comprising:

a shaft;

a shaft receiving member having and a one-way resiliently-loaded shaft retention member in the shaft receiving member;

the shaft having a groove in its circumference into which the shaft retention member is resiliently urged upon insertion of the shaft in the shaft receiving member, the shaft retention member being so arranged in the shaft receiving member that movement apart of the shaft and shaft receiving member is prevented by the shaft retention member;

the shaft retention member being in the form of a torsion spring having a part for engagement in the groove of the shaft and the torsion spring being wound around a clamping bolt provided to clamp the shaft receiving member onto the shaft when the shaft retention member is resiliently engaged in the groove of the shaft.

5. A shaft coupling according to claim 4, wherein the end of the shaft in the region of the groove is splined, the splines of the shaft engaging when coupled in corresponding splines of a shaft receiving bore of the shaft receiving member.

6. A shaft coupling according to claim 4, wherein the spring is prevented from rotation in one direction.

* * * * *